(12) United States Patent
Haas

(10) Patent No.: US 8,321,268 B2
(45) Date of Patent: Nov. 27, 2012

(54) METHOD FOR PROVIDING TARGETED ADVERTISING WHILE MAINTAINING PRIVACY OF PERSONAL INFORMATION OF RECIPIENTS

(75) Inventor: Bertrand Haas, New Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 712 days.

(21) Appl. No.: 12/127,203

(22) Filed: May 27, 2008

(65) Prior Publication Data
US 2009/0307087 A1 Dec. 10, 2009

(51) Int. Cl.
*G06Q 40/00* (2012.01)
(52) U.S. Cl. .................................... 705/14.1
(58) Field of Classification Search .................. 705/144
See application file for complete search history.

(56) References Cited

U.S. PATENT DOCUMENTS

| | | | |
|---|---|---|---|
| 7,590,547 B2 * | 9/2009 | Lagadec et al. | 705/307 |
| 2006/0277075 A1 * | 12/2006 | Salwan | 705/3 |
| 2008/0133345 A1 * | 6/2008 | Cordery et al. | 705/14 |

* cited by examiner

*Primary Examiner* — Hani M Kazimi
*Assistant Examiner* — Hatem M Ali
(74) *Attorney, Agent, or Firm* — Brian A. Lemm; Charles R. Malandra, Jr.; Steven J. Shapiro

(57) ABSTRACT

A method by which a services vendor, such as, without limitation, a health insurance company or a pharmaceutical company, among others, can provide targeted advertising to recipients based on the recipients' private personal information while still maintaining the confidentiality of such information.

24 Claims, 2 Drawing Sheets

METHOD FOR PROVIDING TARGETED ADVERTISING WHILE MAINTAINING PRIVACY OF PERSONAL INFORMATION OF RECIPIENTS

FIELD OF THE INVENTION

The present invention relates to targeted adverting, and in particular to a method by which a vendor, such as, without limitation, a health insurance company or a pharmaceutical company, among others, can provide targeted advertising to recipients based on each recipients' private information while still maintaining the confidentiality of such information.

BACKGROUND OF THE INVENTION

Health care vendors, such as, without limitation, health insurance providers or pharmaceutical companies, would like to have access to databases that are maintained by health care providers, such as physician groups, hospitals, physical or occupational therapy groups, among others, which contain the name, address and private health information of its patients. The private information would be used by the health care vendor to help the health care vendor to decide which products and/or services should be advertised to each patient. Studies have confirmed the more a direct mail offer can be customized for a particular intended recipient, for example to include some personal information relating to the recipient, the more likely that it is to be successful. Such customized direct mail, however, requires knowledge of the personal and/or confidential information of the intended recipient. The problem is that in the United States, the privacy of such information is protected by the Health Insurance Portability and Accountability Act of 1996, commonly known as HIPAA, and most patients would not want the information to be in the hands of health care vendors who may not be able to be trusted to keep that information private and which normally are not bound by any type of privacy obligation.

Thus, there is a need for a system and method by which a services vendor can provide targeted advertising to recipients based on each recipients' private personal information, while at the same time maintaining the confidentiality of that information.

SUMMARY OF THE INVENTION

In one embodiment, the invention provides a method of providing targeted advertising based on personal information of a plurality of customers of a service provider. Each of the customers has a personal identification, which may include the customer's full name and address. Each personal identification is associated with an anonymous identification (such as, without limitation, a pseudo randomly generated number) in a first collection of information (e.g., a database) maintained by the service provider. In addition, each anonymous identification is associated with an item of personal information (that does not identify the customer) in a second collection of information maintained by the service provider. The item of personal information that is associated with each anonymous identification is also associated with the customer identified by the personal identification that is associated with that same anonymous identification. The method includes receiving the second collection of information from the services provider, and for each anonymous identification in the second collection of information, preparing a mailpiece (i) having a representation of the anonymous identification thereon, and (ii) including a personalized advertisement based on the item of personal information that is associated with the anonymous identification. The method further includes providing each mailpiece to a party (which may be a third party or the services provider itself) that has the first collection of information, wherein for each mailpiece, the party provides on the mailpiece at least a portion of the personal identification that is associated with the anonymous identification provided on the mailpiece. Each of the mailpieces may then be mailed to the identified recipient.

In one particular embodiment, each anonymous identification includes a false name and mailing address, and the party uses the false name and mailing address provided on each mailpiece to obtain the personal identification that is associated with the false name and mailing address. In this embodiment, the party may be a postal service, wherein the first collection of information is input into a change of address database maintained by the postal service. The change of address database is then used to obtain the personal identification associated with each false name and mailing address.

In another embodiment, the invention provides a method of providing targeted advertising based on personal information of a plurality of customers of a services provider. Each of the customers has a personal identification, which may include the customer's full name and address. Each personal identification is associated with an anonymous identification in a first collection of information maintained by the services provider, and each anonymous identification is associated with an item of personal information (that does not identify the customer) in a second collection of information maintained by the services provider. In the second collection of information, the item of personal information associated with each anonymous identification is also associated with the customer identified by the personal identification that is associated with the anonymous identification. The method includes receiving a plurality of mailpieces from a vendor having the second collection of information, wherein each of the mailpieces (i) corresponds to a respective one of the anonymous identifications, (ii) has a representation (e.g., a barcode) of the respective one of the anonymous identifications thereon, and (iii) includes a personalized advertisement based on the item of personal information that is associated with the respective one of the anonymous identifications. In addition, for each of the mailpieces, the method includes providing on the mailpiece at least a portion of the personal identification that is associated with the anonymous identification provided on the mailpiece. Each of the mailpieces may then be mailed to the identified recipient.

In still another embodiment, the invention provides a method of facilitating targeted advertising based on personal information of a plurality of customers of a services provider. Each of the customers has a personal identification, which may include the customer's full name and address. The method includes generating a plurality of anonymous identifications (such as, without limitation, a plurality of pseudo randomly generated numbers), generating a first collection of information in which each personal identification is associated with a respective one of the anonymous identifications, and generating a second collection of information in which each anonymous identification is associated with an item of personal information (that does not identify the customer), wherein the item of personal information associated with each anonymous identification is also associated with the customer identified by the personal identification that is associated with the anonymous identification. The method further includes providing the second collection of information to a party, preferably a vendor, that, for each anonymous identification in the second collection of information, prepares a mailpiece (i) having a representation of the anonymous identification thereon, and (ii) including a personalized advertisement based on the item of personal information that is associated with the anonymous identification. Each of the mailpieces is provided to a second party (which may be a third party or the services provider itself) that provides on the mailpiece at least a portion of the personal identification that is associated with the anonymous identification provided on the mailpiece. Each of the mailpieces may then be mailed to the identified recipient.

In one particular embodiment, each anonymous identification includes a false name and mailing address, and the second party uses the false name and mailing address provided on each mailpiece to obtain the personal identification that is associated with the false name and mailing address. The second party in this embodiment may be a postal service, wherein the first collection of information is input into a change of address database maintained by the postal service, and the change of address database is used to obtain the personal identification associated with each false name and mailing address.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
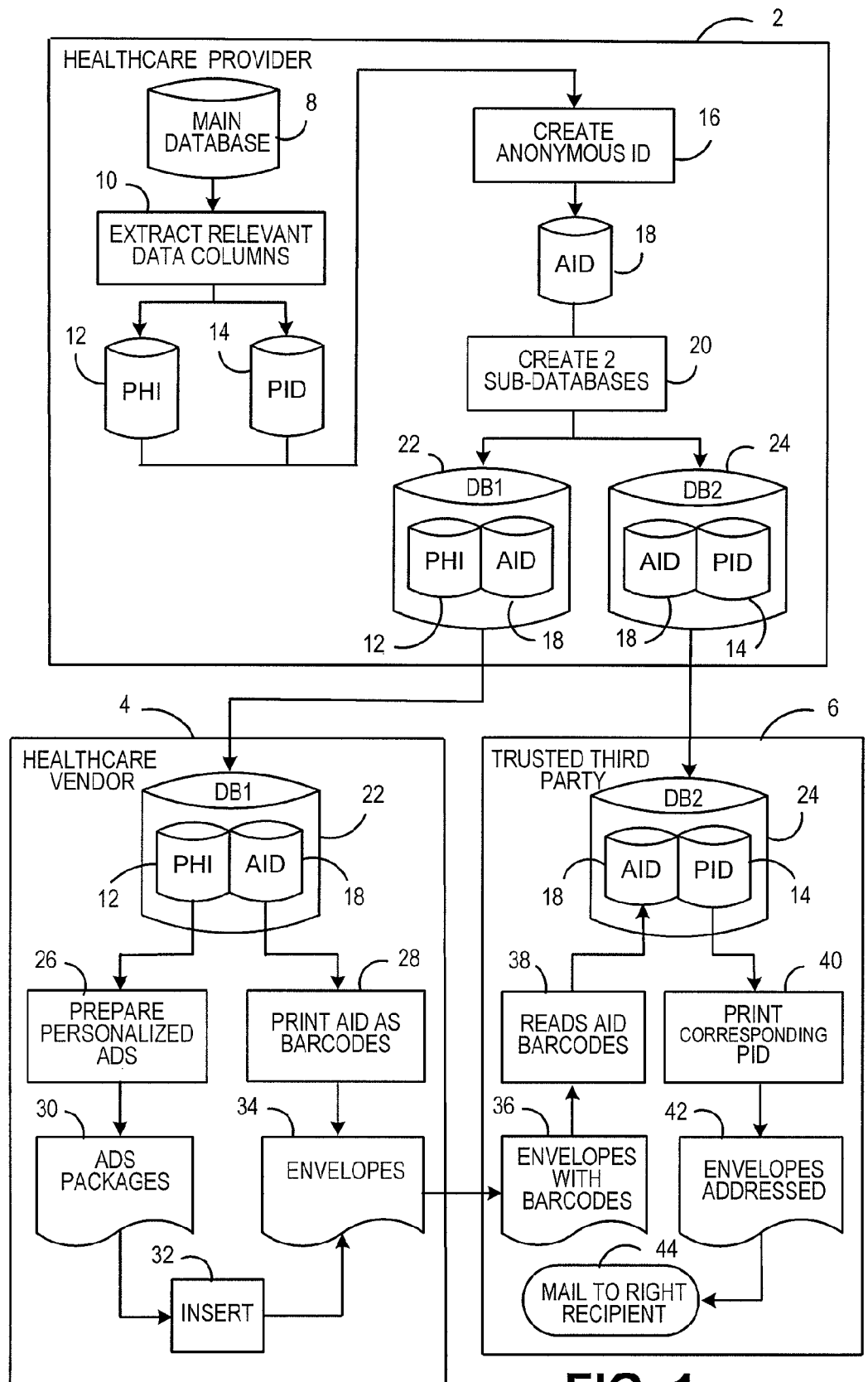
FIG. 1 is a schematic diagram which illustrates a method of providing targeted advertising to recipients based on their private personal information according to a first embodiment of the present invention.

FIG. 1 is a schematic diagram which illustrates a method of providing targeted advertising to recipients based on their private personal information according to a first embodiment of the present invention. The private personal information does not identify the name of the recipient, or provide information from which the name of the recipient could easily be determined. The private personal information may be, for example, an item of health information about the specific recipient, such as, for example, medical conditions, medical history, etc. As used herein, the term "item of health information" shall mean one or more pieces of related or unrelated health information. As seen in FIG. 1, this embodiment contemplates a health care provider 2, which may be, without limitation, a group of physicians, a hospital, a therapy provider, or any other organization which provides health care services to a number of patients. This embodiment also contemplates a health care vendor 4, which may be, without limitation, an insurance company, a pharmaceutical company, or any other business that has a health related product and/or service that it may desire to market to a number of individuals. Finally, this embodiment contemplates a trusted third party 6, the function of which is described in more detail below, and which may be a third party service provider, or in one specific embodiment, the health care provider 2 itself.

As seen in FIG. 1, the health care provider 2 maintains a main database 8 which contains the private health information (PI) of its patients linked (e.g., in a relational table) to each patient's identification (PID), usually consisting at least of each patient's full name and mailing address. As illustrated at 10, the health care provider 2 extracts from the main database 8 a private health information dataset 12, which consists of each patient's private health information (not associated with the patient's ID), and a patient identification dataset 14, which consists of the patient identifying information (e.g., the full name and address) of each patient which has information in the main database 8. The health care provider 2 then, as illustrated at 16, creates an anonymous identification (AID), such as, without limitation, a pseudo-randomly generated serial number, for each patient that has patient health information 12 stored in the main database 8. The set of anonymous identifications is shown at reference numeral 18. Then, as illustrated at 20, the health care provider 2 creates two sub-databases. The first sub-database 22 includes the patient health information dataset 12 with each item thereof being linked with one of the anonymous identifications in the anonymous identification dataset 18. The second sub-database 24 links each anonymous identification in the anonymous identification dataset 18 with a corresponding one of the patient identifications contained in the patient identification dataset 14. The item of patient health information with which each piece of anonymous identification is linked in the first sub-database 22 will be the patient information for the patient identified by the patient identification with which the particular anonymous identification is linked in the second sub-database 24.

The health care provider 2 then sends the first sub-database 22 to the health care vendor 4 and the second sub-database 24 to the trusted third party 6, which may be a third party service provider, or, in one particular embodiment, may be the health care provider 2 itself. As shown at 26, the health care vendor 4, once in possession of the first sub-database 22, prepares a personalized advertisement for each anonymous identification included in the first sub-database 22 based upon the associated personal health information contained in the first sub-database 22. In addition, the health care vendor 4 also prints each of the anonymous identifications on an envelope as illustrated at 28. In the embodiment shown, the anonymous identifications are printed in the form of a barcode, such as a one-dimensional or two-dimensional barcode. As shown at 30, 32 and 34, the health care vendor 4 then inserts each personalized advertisement package into the envelope having the anonymous identification printed thereon that corresponds to the anonymous identification associated with the personalized advertisement. The health care vendor 4 then sends the filled and sealed envelopes having the barcodes printed thereon to the trusted third party 6, as illustrated at 36 in FIG. 1. As just described, each of those envelopes will include therein a personalized advertisement created specifically for one of the particular anonymous identifications and will have that particular anonymous identification printed thereon in the form of a barcode.

Next, as shown at 38 and 40, the trusted third party 6 reads each anonymous identification from each envelope, uses that anonymous identification to access the associated personal identification from the sub-database 24, and prints the corresponding personal identification on each envelope. Thus, as illustrated at 42, when finished with this processing, the trusted third party 6 will have a number of envelopes, each being addressed to a particular one of the patients included in the second sub-database 24 and each including a personalized advertisement that was prepared specifically for that patient based on the patient's personal health information. Then, as illustrated at 44, the trusted third party 6 will mail the envelopes to each addressee. Thus, the methodology illustrated in FIG. 1 will result in the health care vendor 4 being able to send targeted advertising to particular patients of the health care provider 2 based upon each patient's personal health information that is included in the main database 8 without ever knowing with which each patient the particular information was associated. That information is maintained in confidence by both the health care provider 2 and the trusted third party 6.

Figure 2:
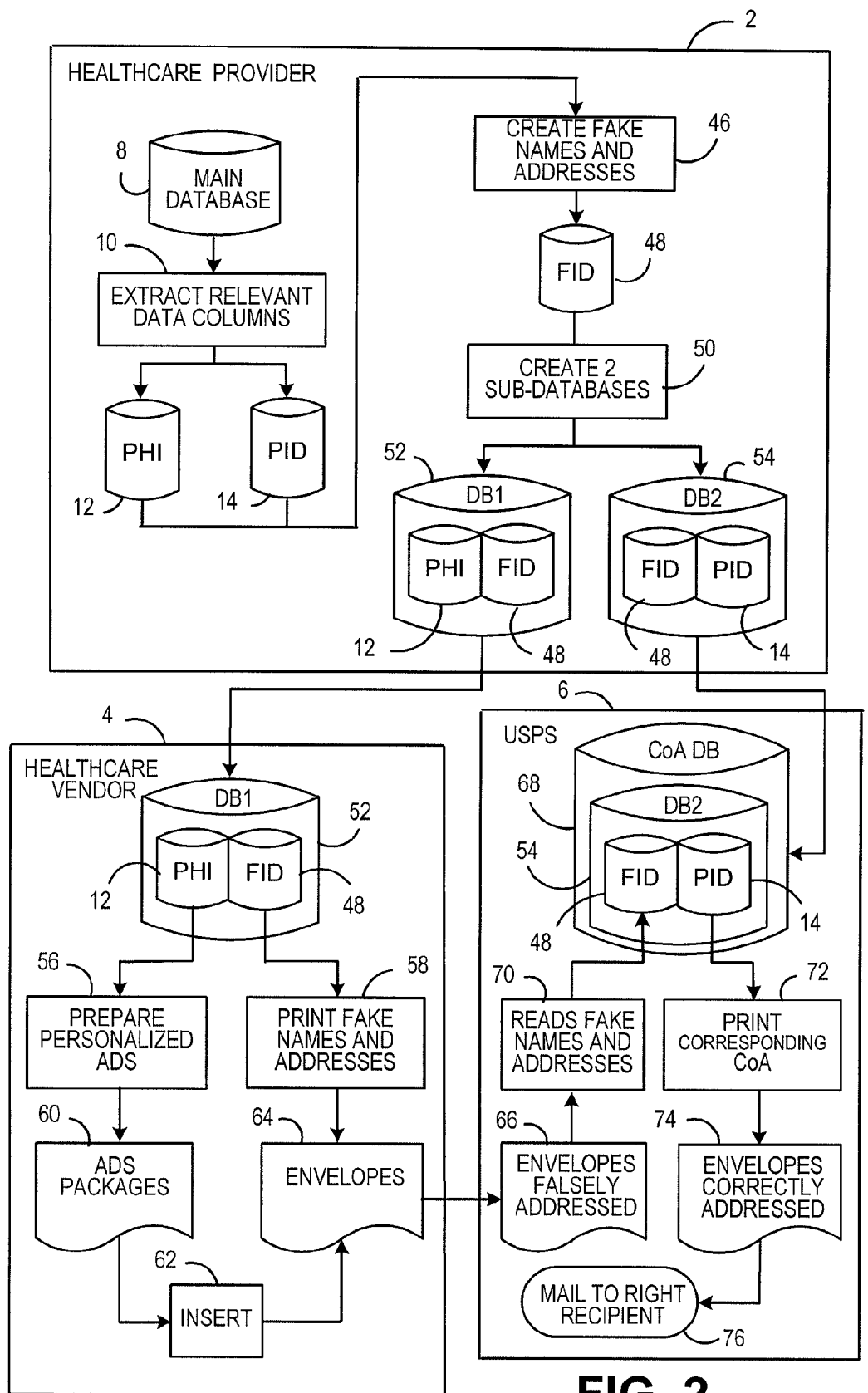
FIG. 2 is a schematic diagram which illustrates a method of providing targeted advertising to recipients based on their private personal information according to a second embodiment of the present invention.

FIG. 2 is a schematic diagram which illustrates a method according to an alternative embodiment of the invention wherein the trusted third party 6 is the United States Postal Service. In this embodiment, the health care provider 2, as illustrated at 46, creates a fake name and address for each of the patients included in the main database 8, thereby producing a fake identification dataset (FID) 48. The health care provider 2 then creates two separate sub-databases, as illustrated at 50. Specifically, the health care provider 2 creates a first sub-database 52 that includes each patient's personal health information 12 associated with one of the fake identifications from the fake identification dataset 48. The health care provider 2 also creates a second sub-database 54 in which each fake identification is associated with the personal identification of the patient with whose personal information that fake identification was associated in the sub-database 52. The health care provider 2 sends the first sub-database 52 to the health care vendor 4 and the second sub-database 54 to the United States Postal Service 6 (or some other postal authority if implemented in another country). The health care vendor 4 then, as illustrated in box 56, creates a personalized advertisement for each fake identification in the fake identification dataset 48 based upon the personal health information that is associated therewith in the first sub-database 52. As illustrated at 58, the health care vendor 4 then prints each of the fake identifications (which include a name and address for each) on a corresponding envelope. Then, as shown at 60, 62 and 64, each personalized advertisement is inserted into the envelope that includes the fake identification that is associated with the personal health information on which that particular personalized advertisement was based. As shown at 66, those falsely addressed envelopes are provided to the United States Postal Service 6 (preferably with sufficient postage provided thereon) for delivery.

The United States Postal Service 6, upon receipt of the second sub-database 54, feeds the information included therein into their change of address database 68, which will result in each fake identification in the second sub-database 54 having its address changed to the corresponding correct address included in the second sub-database 54. In addition, as shown at 70 and 72, the United States Postal Service 6, upon receiving the falsely addressed envelopes, reads each fake name and address therefrom, accesses the change of address database 68 to determine to the address to which that fake name and address was changed, and prints the corresponding correct address on the envelope, resulting in a number of correctly addressed envelopes as shown at 74. As shown at 76, those correctly addressed envelopes are then mailed to each recipient. Thus, the methodology shown in FIG. 2 will result in personalized advertisements being sent from the health care vendor 4 to a targeted individual based upon that individual's personal health information that is included in the main database 8 without the health care vendor 4 having access to the particular individual with which the personal health information is associated.

Thus, in both embodiments described herein, the health care vendor 4 has no idea to whom and to where their targeted ads are going, and is therefore unable to link the personal health information in the first sub-database 22 or 52 with the patient identifications from the main database 8. The health care vendor 4 does, however, know that its personalized advertisements are properly tailored for a particular recipient. Furthermore, the trusted third party 6, whether it is a third party service provider, the health care provider 2 or the United States Postal Service 6, knows who the recipient of each mailing is, but has no knowledge of the particular advertisements, and is therefore unable to link the listed recipients with their particular personal health information that is included in the main database 8.

While the above embodiments have been described with respect to healthcare providers, their patients, and their patients' health information, the present invention is not so limited and can be utilized with any type of service provider, their customers, and their customer's personal information. For example, the service provider may be a financial services company, and their customer's personal information may be related to income levels, investment portfolios, or other financial information that a customer would want to keep private.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of providing targeted advertising based on personal information of a plurality of customers of a service provider, each of said customers having a personal identification the method comprising:

receiving, by a processing device, a database of information from said services provider, said database of information storing an anonymous identification in association with an item of personal information of a respective customer, the anonymous identification being stored in association with the personal identification of the respective customer in a different database of information;

extracting, by the processing device, each anonymous identification in the received database of information and preparing a mailpiece including a personalized advertisement based on the item of personal information that is associated with the anonymous identification;

printing, by a printing device, a representation of the anonymous identification on the mailpiece; and providing each said mailpiece to a party having said different database of information, wherein for each said mailpiece, the party prints on the mailpiece, using a printing device, at least a portion of the personal identification that is associated with the anonymous identification provided on the mailpiece, wherein the service provider is a healthcare provider, the customer is a patient of the healthcare provider, and the personal information is health information.

2. The method according to claim 1, wherein said party is a third party.

3. The method according to claim 1, wherein said party is said services provider.

4. The method according to claim 1, wherein each personal identification includes a name and mailing address of the associated customer.

5. The method according to claim 1, wherein each anonymous identification includes a pseudo randomly generated number.

6. The method according to claim 1, wherein each said representation of the anonymous identification is a barcode.

7. The method according to claim 1, wherein each anonymous identification includes a false name and mailing address, and wherein the party uses the false name and mailing address provided on each mailpiece to obtain the personal identification that is associated with the false name and mailing address.

8. The method according to claim 7, wherein the party is a postal service and wherein said first database of information is input into a change of address database maintained by said postal service, said change of address database being used to obtain the personal identification associated with each false name and mailing address.

9. A method of providing targeted advertising based on personal information of a plurality of customers of a services provider, each of said customers having a personal identification, the method comprising:

receiving, by a processing device, a first database of information from said services provider, said first database of information storing each personal identification in association with an anonymous identification;

receiving a plurality of mailpieces from a vendor having a second database of information, said second database of information storing an anonymous identification associated with an item of personal information, wherein the item of personal information associated with each anonymous identification is also associated with the customer identified by the personal identification that is associated with the anonymous identification, each said mailpiece (i) corresponding to a respective one of the anonymous identifications, (ii) having a representation of the respective one of the anonymous identifications thereon, and (iii) including a personalized advertisement based on the item of personal information that is associated with the respective one of the anonymous identifications; and for each said mailpiece, printing on the mailpiece, using a printing device, at least a portion of the personal identification that is associated with the anonymous identification provided on the mailpiece, wherein the service provider is a healthcare provider, the customers are patients of the healthcare provider, and the personal information is health information.

10. The method according to claim 9, further comprising receiving said first database of information from said services provider.

11. The method according to claim 9, wherein said services provider performs said receiving and providing steps.

12. The method according to claim 9, wherein each personal identification includes a name and mailing address of the associated customer.

13. The method according to claim 9, wherein each anonymous identification includes a pseudo randomly generated number.

14. The method according to claim 9, wherein each said representation of the anonymous identification is a barcode.

15. The method according to claim 9, wherein each anonymous identification includes a false name and mailing address, and providing on the mailpiece at least a portion of the personal identification further comprises using the false name and mailing address provided on each mailpiece to obtain the personal identification that is associated with the false name and mailing address.

16. The method according to claim 15, wherein providing on the mailpiece at least a portion of the personal identification further comprises inputting said first database of information into a change of address database maintained by a postal service, and using said change of address database to obtain the personal identification associated with each false name and mailing address.

17. A method of facilitating targeted advertising based on personal information of a plurality of customers of a service provider, each of said customers having a personal identification, the method comprising:

generating, by a processing device, a plurality of anonymous identifications;

associating, by the processing device, each personal identification with a respective one of said anonymous identifications;

storing by the processing device in a first database of information each personal identification and associated anonymous identifications;

associating by the processing device each anonymous identification with an item of personal information, wherein the item of personal information associated with each anonymous identification is also associated with the customer identified by the personal identification that is associated with the anonymous identification;

storing by the processing device in a second database of information each anonymous identification and associated item of personal information; and providing by the processing device the second database of information to a party that, for each anonymous identification in the second database of information, prepares a mailpiece by printing the anonymous identification thereon and including a personalized advertisement based on the item of personal information that is associated with the anonymous identification, wherein each said mailpiece is provided to a second party that prints on the mailpiece at least a portion of the personal identification that is associated with the anonymous identification printed on the mailpiece, and wherein the service provider is a healthcare provider, the customers are patients of the healthcare provider, and the personal information is health information.

18. The method according to claim 17, further comprising providing said first database of information to said second party.

19. The method according to claim 17, wherein said second party performs said generating steps and said providing steps, said method further comprising receiving each said mailpiece from said party.

20. The method according to claim 17, wherein each personal identification includes a name and mailing address of the associated customer.

21. The method according to claim 17, wherein each anonymous identification includes a pseudo randomly generated number.

22. The method according to claim 17, wherein each said representation of the anonymous identification is a barcode.

23. The method according to claim 19, wherein each anonymous identification includes a false name and mailing address, and wherein said second party uses the false name and mailing address provided on each mailpiece to obtain the personal identification that is associated with the false name and mailing address.

24. The method according to claim 23, wherein said second party is a postal service and wherein said first database of information is input into a change of address database maintained by said postal service, said change of address database being used to obtain the personal identification associated with each false name and mailing address.

* * * * *